United States Patent [19]

Palmour, III et al.

[11] 4,303,448
[45] Dec. 1, 1981

[54] OLIVINE REFRACTORY BRICKS FOR HEAT STORAGE APPLICATIONS

[75] Inventors: Hayne Palmour, III; Billy M. Gay; Ronald L. Cochrane, all of Raleigh, N.C.

[73] Assignee: North Carolina State University, Raleigh, N.C.

[21] Appl. No.: 153,859

[22] Filed: May 28, 1980

[51] Int. Cl.³ ............................................. C04B 35/16
[52] U.S. Cl. .................................................... 501/127
[58] Field of Search ..................................... 106/60, 62

[56] References Cited

U.S. PATENT DOCUMENTS

| | | | |
|---|---|---|---|
| 2,077,793 | 4/1937 | Harvey et al. | 106/60 |
| 2,105,943 | 1/1938 | Goldschmidt | 106/60 |
| 2,252,317 | 8/1941 | Goldschmidt | 106/60 |
| 2,335,407 | 11/1943 | Goldschmidt | 106/59 |
| 3,316,106 | 4/1967 | Montague et al. | 106/60 |

*Primary Examiner*—James Poer
*Attorney, Agent, or Firm*—Bell, Seltzer, Park & Gibson

[57] ABSTRACT

This invention relates to an olivine refractory brick having thermal and physical properties suitable for use as a thermal energy storage unit in an electric thermal storage furnace and characterized by having excellent thermal shock properties and resistance to spalling. The brick consists essentially of densely compacted grains of olivine and a plastic refractory kaolin binder which effects a sintered, liquid assisted but substantially solid state grain-to-grain bonding of the olivine grains.

22 Claims, No Drawings

OLIVINE REFRACTORY BRICKS FOR HEAT STORAGE APPLICATIONS

FIELD OF THE INVENTION

This invention relates to a ceramic refractory shape or brick formed from olivine and which is suitable for use as a thermal energy storage unit in an electric thermal storage furnace.

BACKGROUND OF THE INVENTION

Electric heat storage furnaces have been used for a number of years in Europe, where time-of-day electric power rate structures are utilized by the power companies as a means for managing peak power demands. These heat storage furnaces contain high heat capacity refractory bricks, typically composed of magnesite or olivine, which are electrically heated with resistance heating elements during off-peak hours when the electric power rates are lowest. During peak periods when electricity costs more, an air delivery system circulates air through the heated bricks, and delivers the heated air at the desired temperature as required.

Due to the increasing peak power demands on domestic utility companies and the high cost of building additional generating capacity, time-of-day power rate structures of the type already in use in Europe have begun to receive favorable consideration in the United States. The introduction of this type of rate structure will make it economically desirable to use the above-noted type of heat storage furnace for residential, commercial and industrial heating.

Because of its high heat capacity and relatively low cost, olivine, a magnesium-iron-orthosilicate mineral, has been widely used in producing the heat storage bricks used in English and German heat storage furnaces. The olivine for use in these bricks comes principally from deposits located in Norway, Sweden, and Austria. However, because of the weight and fragile nature of these European heat storage bricks, it is impractical and economically unfeasible to import such bricks for use in the U.S. market.

The United States has extensive deposits of olivine in western North Carolina, northern Georgia, and in the State of Washington. Olivine from these deposits differs somewhat compositionally from the olivine found in European deposits and heretofore has been utilized principally for refractories, foundry sand, blasting sand and as a fluxing agent in blast furnaces. Olivine from domestic deposits has not heretofore been used for heat storage applications.

With the foregoing in mind, it is a primary objective of the present invention to produce from domestic rather than imported olivine, an olivine refractory brick having thermal and physical properties suited for heat storage furnace applications.

It is a further objective of this invention to produce such products economically from domestic raw materials by processes which are compatible with domestic ceramic industrial practices, and having optimal physical and thermal properties which are consistent with domestic utilization of off-peak energy storage technology. In this regard, it should be understood that existing differences in lifestyles, climates, housing designs and construction methods, as well as differences in relative costs of various energy forms and relative availability of investment capital between the United States and Europe will dictate the development of differently sized, controlled and optimized heat storage furnaces for the United States market, and consequently the optimal ceramic refractories for such domestic heat storage furnaces may need to be technically different from their older European counterparts.

SUMMARY OF THE INVENTION

The present invention has succeeded in producing from domestic olivine, an olivine refractory brick having thermal and physical properties highly suitable for use as a thermal energy storage unit in an electric thermal storage furnace. Moreover, the olivine refractory brick of this invention exhibits thermal shock properties and resistance to spalling which are actually superior to the English olivine bricks produced from European olivine.

The olivine brick of the present invention consists essentially of densely compacted grains of olivine and a plastic refractory kaolin binder which serves to effect a sintered, liquid assisted but substantially solid state grain-to-grain bonding between the grains of olivine. It is this well sintered structure, coupled with some inherent, controlled microcracking extending not only along the intergranular bond areas but also extending through the olivine grains, which results in very favorable thermal shock resistance and other desirable thermal and physical properties.

Based upon published phase diagrams and known information concerning the characteristics of olivine, one skilled in the ceramics art can expect that olivine-based ceramics will be relatively intolerant of alumina additives if refractoriness is to be maintained. Kaolin, an alumina-containing mineral, when used in association with olivine, can be expected to present certain significant problems in producing a high density refractory article from olivine. The presence of the alumina additives in the olivine system, for example, reduces the temperature at which the article can be fired, increases the criticality of temperature control, and increases the propensity for slumping, creep or distortion during firing due to the very fluid phase formed by the alumina in the presence of olivine at firing temperatures. This fluid phase further acts as a flux to take into solution some of the lower melting constituents of the olivine, thus resulting in reduced density of the product. For these reasons, one skilled in the ceramics field would find kaolin to be an unlikely candidate as a binder for olivine in producing a product having the particular specialized characteristics and properties needed in a thermal energy storage unit.

However, in accordance with the present invention, the presence of kaolin in controlled quantities is utilized in achieving a well-sintered liquid assisted bond structure with a unique microstructure characterized by beneficial controlled microcracking.

In producing the olivine bricks of this invention, the olivine material is carefully sized to obtain high packing density. Preferably, the olivine grains have a size of less than 4 mesh (Tyler Sieve Series) with a significant fraction finer than 65 mesh. By way of example, a suitable particle size distribution is one in which about 40% by weight is between 8 and 20 mesh, about 30% by weight is between 20 and 65 mesh, and about 30% by weight is finer than 65 mesh.

Most desirably, in order to obtain most effective packing density, the olivine grains are sized by deliberate gap grading, a known procedure wherein the material is sized into specific size fractions and then recombined with known percentages of each size fraction. This results in leaving out certain size fractions, such that the smaller size fractions which are present are sized so as to more readily nest in the interstices between the larger fractions. A preferred particle size distribution of the olivine grains of the present invention, accomplished by deliberate gap grading, is one in which more than 40% by weight is between 4 and 20 mesh, less than 30% by weight is between 20 and 65 mesh, and about 35% by weight is finer than 65 mesh.

To the crushed and sized olivine there is added a small amount of a kaolin binder. The kaolin should be a refractory grade of kaolin, and should be used in a controlled amount to achieve a well sintered liquid assisted but substantially solid state grain-to-grain bond structure between the grains of olivine. By way of example, tests have determined that for a particular grade of a plastic refractory Georgia kaolin, the preferred amount of kaolin is within the range of about 1.25% to 5% by weight, and most desirably about 2.5% by weight.

To the olivine and kaolin mixture there are added conventional processing additives and water (about 4%) to provide sufficient lubricity and cohesion to permit successful forming by conventional dry pressing methods. After drying, first in air and thereafter at about 150° F. the formed shapes develop excellent green strength and can be handled without difficulty during placement in kilns, etc. Preferably the bricks should have a green bulk density of at least about 2.3 grams per cubic centimeter, and most desirably within the range of 2.37 to 2.75 grams per cubic centimeter. Firing is carried out at a temperature of about 1357° to 1454° C. (2475° to 2650° F.) depending upon the degree of purity of the olivine and the amount of bond phase added, with a soaking time of about 2.5 hours. Total firing time is about 12 hours, exclusive of cooling.

The resulting fired bricks desirably have a bulk density of at least about 2.50 grams per cubic centimeter and preferably within the range of about 2.58 to 2.93 grams per cubic centimeter. In terms of thermal characteristics, the bricks preferably have a volumetric heat capacity at 100° C. of at least 0.525 cal./cc. °C. and a thermal conductivity at 100° C. greater than 0.005 cal./cm. sec. °C.

The specific shape of the olivine brick will vary depending upon the size and other design criteria of the particular heat storage furnace in which it is utilized. Typically, a thermal storage brick for use in a heat storage furnace is shaped so that when assembled in stacked relationship, channels are provided for receiving the electric heating elements and to provide the necessary air passageways. It is to be understood, however, that the term "brick" as used herein is intended in a generic sense and is not intended to refer to any specific configuration or shape.

The kaolin-bonded olivine brick product of this invention was compared with a commercially available English produced olivine brick and a shale-bonded experimental brick using domestic olivine. These property comparisons showed that the kaolin bonded olivine brick of this invention displays physical and thermal properties and mechanical strengths equal to and in some respects considerably better than either the English olivine brick or the shale-bonded domestic olivine brick.

More particularly, comparisons of the kaolin-bonded brick of this invention with the English brick and the shale bonded experimental brick have unexpectedly shown that the olivine brick of this invention exhibits superior resistance to thermal shock failure and to "dusting" (fine spallation at air channel surfaces), as compared at both the English and the shale bonded olivine bricks, which showed dusting, spalling and cracking after only about 30 cycles of normal use.

The superior thermal shock properties and resistance to spalling are of considerable significance in a thermal heat storage furnace application. Since air is circulated directly into contact with the thermal storage bricks, any degradative spalling or dusting of the bricks would be carried by the circulated air into the areas being heated by the furnace, undesirably increasing the dust level in these areas. Further, in the normal 30 year expected lifetime of a heat storage furnace, during which the bricks may undergo 5200 to 6000 heating/cooling cycles, the excellent resistance to thermal shock failure and spalling displayed by the bricks of this invention means that these bricks will have a significantly longer useful life than the bricks now available. Additionally, and perhaps no less important, it is known that asbestos is geologically and compositionally quite similar to olivine, and asbesti-form minerals are often found associated with olivine deposits. The well sintered microstructure and superior thermal shock properties of the olivine bricks of the present invention greatly reduce the possibility of asbesti-form minerals being circulated through a house as a result of dusting or spalling of the thermal storage bricks.

PRIOR ART

There is very little recent literature on the specific topic of olivine refractories for heat storage applications. Most of the olivine refractory research which has been carried on in recent years was directed at metallurgical refractory applications. Though there will certainly be some inherent similarities in processing of all ceramic refractories, the markedly different nature of the applications, i.e. metallurgical versus heat storage, dictate quite different optimization criteria for heat storage refractories in terms of resistance to hostile environments, useful lifetimes, thermal properties and product economics. Consequently, the prior art relating to olivine refractory materials for metallurgical applications is of little value to one skilled in the art in addressing the specific problems of olivine refractories for heat storage applications.

In view of the dearth of published information relating to olivine refractories for heat storage applications, chemical and physical analyses were undertaken of foreign and domestic olivine raw materials and of existing commercially available European olivine heat storage bricks. Pertinent data extracted from these preliminary studies formed a basis for approaching the objectives of this invention.

Table I gives typical chemical compositions of commercially available German and English olivine heat storage bricks, together with that of the parent European olivine ores and a typical domestic olivine ore.

TABLE I

Chemical analyses of European and North Carolina olivines and of various heat storage bricks

| | Typical Swedish Olivine | Typical Norwegian Olivine | Typical North Carolina Olivine | Typical German Olivine Brick+ | Typical English Olivine Brick++ |
|---|---|---|---|---|---|
| MgO | 42.6% | 46.0% | 46.0% | 51.0% | 45.0% |
| $SiO_2$ | 41.5 | 43.4 | 42.8 | 41.0 | 41.5 |
| $Al_2O_3$ | 1.02 | 1.07 | 0.68 | 0.64 | 3.04 |
| $Fe_2O_3$ | 9.1 | 6.4 | 8.2 | 7.0 | 8.1 |
| CaO | 0.57 | 0.29 | 0.12 | 0.17 | 0.52 |
| $K_2O$ | — | — | 0.04* | 0.02 | 0.29 |
| $Na_2O$ | — | — | — | 0.05 | 0.13 |
| NiO | 0.24 | 0.27 | 0.16 | 0.23 | — |
| $Cr_2O_3$ | 0.87 | 0.60 | 0.27 | 0.15 | — |
| LOI** | 3.68 | 1.21 | 1.91 | 0.21 | 0.70 |

*Includes $Na_2O$
**Loss on ignition
+Presumed to be made from Austrian olivine
++Made from Norwegian olivine The German olivine brick appeared to contain more MgO (and less $Al_2O_3$) than did the parent ore. It presumably had been made somewhat more refractory by incorporating moderate amounts of a comparatively expensive magnesia-rich additive. On the other hand, the English olivine brick appeared to contain less MgO, but to be richer in $Al_2O_3$ (probably also in $Fe_2O_3$ and $R_2O$ flux oxides) that the parent ore. Presumably it had been rendered less refractory and more workable by an admixture of relatively impure (but probably quite plastic) clay or shale. A variety of X-ray, microstructural and physical evidences suggested that the German olivine product had been fired at a much higher temperature than its English counterpart, i.e. about 500° to 600° F. higher.

Examination of sections of the brick under the electron microscope revealed that the English bricks exhibit a clay-derived glassy second phase bonding of the olivine grains. More specifically, the olivine grains are essentially unaltered by the second phase bond coating; but are disposed in a glassy matrix which surrounds and extends between adjacent grains and binds them together. Analysis of bricks which have been subjected to repeated heating and cooling cycles of the type encountered in the normal use of a heat storage furnace showed that the bricks exhibit minute cracks extending along the grain boundaries, i.e. in the glassy intergranular bond areas. This intergranular cracking is indicative of initial stages of degradation or destruction of the product as a result of the thermal shock to which it had been subjected. The very high fired MgO-enriched German brick displayed evidences of partial melting of the olivine grains to form a very refractory glassy phase which had partially recrystallized during cooling.

DETAILED DESCRIPTION OF THE INVENTION

In contrast to what was observed in the European olivine brick samples, the kaolin bonded domestic olivine brick of the present invention, under electron microscopic analysis, exhibits a well sintered liquid assisted, but substantially solid state grain-to-grain bond structure characterized by the formation of neck regions between the altered grains.

Solid state sintering occurs when no liquid phase is formed, and the transport is through the solid phase by volume diffusion and/or grain boundary diffusion. A solid state sintered bond exhibits all of the classic sintering phenomena, e.g. growth of neck regions, movement of the grain centers toward one another, (i.e. shrinkage) etc. A liquid assisted solid state bond is one in which small quantities of a liquid phase are present, the liquid helping to provide a transport mechanism and to enable bonding at a lower temperature, but wherein the above-noted characteristics of solid state sintered bonds are also present.

In the liquid assisted, well sintered type of solid state bond structure found in the olivine bricks of this invention, the olivine grains thus tend to be bonded together in contacting interfacial relation with one another rather than being separated from one another by a glassy matrix as in the European samples. This solid state type of sintered bond structure is thought to have occurred in the presence of, and to have been assisted by, small quantities of an aluminous glassy phase derived from the kaolin additive. This bond type was found to be much stronger and more resistant to thermal shock than the glassy phase bonding of the English brick.

Microscopic analysis further revealed that the kaolin-bonded olivine bricks exhibit controlled microcracking extending not only along the grain boundaries but through the olivine grains as well, which is an indication that the bond strength of the intergranular bond areas is at least as strong as the olivine grains themselves. This type of controlled microcracking actually enhances the thermal shock resistance of the brick and does not represent degradation of the product.

A characteristic feature of the controlled microcracking in the kaolin-bonded domestic olivine brick of this invention is that the brick exhibits a temperature dependent thermal conductivity hysteresis effect in the initially fired state; the thermal conductivity at a given temperature being higher during the cooling cycle than during the heating cycle. This hysteresis effect is particularly significant and beneficial at lower temperatures since it gives better heat transfer capabilities during the latter stages of the cooling cycle, making it possible to more effectively extract the last remaining amounts of usable heat from the bricks. The controlled microcracks in the kaolin-bonded olivine bricks of this invention also serve to prevent major degradative cracks from occurring since the microcracks enable the bricks to expand and contract in response to the thermal heat stresses. The microcracking in no way reduces the strength of the brick, and in fact, the physical strength of the kaolin-bonded bricks of this invention is actually higher than the English brick.

To achieve the liquid assisted well sintered solid state type of bond structure which is desired in the olivine bricks of this invention, it is important that the kaolin binder which is used be a refractory kaolin. It is also important that the kaolin binder be used in carefully controlled amounts. Excessive amounts of the kaolin binder will result in the undesirable glassy phase type of bonding, while insufficient amounts of kaolin will fail to enhance grain-to-grain bonding during sintering, thereby reducing the likelihood of controlled microcracking during thermal cycle conditions. For a typical domestically available plastic refractory kaolin, it was found that the kaolin binder should preferably be used in an amount within the range of about 1.25% to 5% by weight. For the particular Georgia kaolin used in test studies of this invention, 2.5% by weight of the kaolin was found to be the optimum level.

Because all of the thermal properties of interest, in particular volumetric heat capacity and thermal conductivity, are known to be directly related to fractional density of the product, processing of the olivine ore (as by beneficiation) and optimal ceramic processing (as by compounding, compacting and sintering) to obtain high bulk (fractional) densities are very important to this class of product. In this regard, gap grading is desirably utilized to maximize effective particle packing for such refractory structure. In the examples to follow, gap grading in the form of optimized weight fractions of predetermined selected size fractions, (coarse, medium and fine) has been employed.

In the green state, the plastic nature of the kaolin-water system and the optional use of conventional fugitive processing additives provide enhanced lubricity and favorable compaction characteristics during processing to enhance density of the unfired product. The green density achieved depends more or less linearly on the logarithm of the forming pressure. Typically, bricks are pressed at forming pressures of from 4,000 up to as high as 30,000 psi to achieve a green brick density of at least 2.3 grams per cubic centimeter. It should also be noted that there is a direct linear correspondence between green density and fired density.

The particular North Carolina olivine ore selected for use in Example 1 below displays very good performance in ceramics without the need for beneficiation. It is appropriate to note, however, that not all North Carolina olivines are alike; rather, they tend to vary considerably in the degree of initial serpentinization, in the makeup of accessory minerals, and in the degree of subsequent weathering. Though the primary olivine phase continues to make up the bulk of the ceramic when fired, it is the accessory minerals which tend to dominate the firing behavior and to exert a very strong influence upon the character of the interfacial bonding between the relatively coarse, rather inert grains of refractory olivine. In some instances it may be highly desirable to subject the olivine ore to beneficiation before ceramic processing and/or to adjust the accessory mineral makeup by means of appropriate mill additions in order to make the ceramic performance of the olivine refractory products less sensitive to these natural variations from deposit to deposit. Consequently, minor modifications to the olivine composition by either mineral beneficiation treatments and/or appropriate mill additions of accessory minerals are regarded as being within the scope of this invention, and the term "olivine" as used herein is, unless otherwise indicated, intended to include olivine ores which have been so modified.

Where beneficiated olivine ores are used, the ore, prior to firing, should typically have a pycnometric density (measured in water) of at least 3.19 grams per cubic centimeter, which is significantly higher than the corresponding density for unbeneficiated olivine ores. Where beneficiated ores are used, the bulk density (green and fired) will be considerably higher than where unbeneficiated ore is used; e.g. preferably at least about 2.51 g./cm.$^3$ (green) and 2.62 g./cm$^3$ (fired).

On the basis of studies conducted thus far involving five or more different deposits from the North Carolina olivine belt, each of which had little or no beneficiation, it is possible to predict good to excellent ceramic performance for those olivine ores like Ellijay #9 which display (1) relatively low concentrations of R$_2$O and RO flux oxide, (2) low ignition losses and (3) relatively high MgO:SiO$_2$ ratio.

The following examples are given for the purpose of illustrating the invention, and are not intended to be understood as limiting the scope of the invention. The percentages expressed are by weight.

EXAMPLE 1

A preferred composition and firing regime has been developed for use with one particular North Carolina olivine (Ellijay #9). In this preferred composition, 2.5% plastic refractory Georgia kaolin is added to crushed and sized, but not otherwise beneficiated, olivine ore to facilitate fabrication of the bricks and to establish a high temperature bond. The olivine is crushed to a minus 8 mesh grain, sized in coarse, medium and fine fractions, and blended in predetermined proportions with the additive clay phase, along with two conventional fugitive organic materials and 4% water. The composition is pressed, dried and then fired to a temperature of about 2475° to 2525° F. (1357° to 1385° C.) to obtain full size (7.75 kilogram) bricks with fractional densities in the 0.75 to 0.82 range. The batch composition is set forth below in Table II.

TABLE II

| Constituent | Kaolin-bonded olivine brick | |
|---|---|---|
| | grams | (%) |
| Ellijay #9 olivine: | | |
| coarse (−8, +20 mesh) | 3013 | 39.03 |
| medium (−20, +65 mesh) | 2259.5 | 29.27 |
| Fine (−65 mesh) | 2259.5 | 29.27 |
| Subtotal olivine | 7532.0 | 97.56 |
| Bond phase: | | |
| kaolin (Ajax P) | 188.2 | 2.44 |
| Subtotal, ceramic solids | 7720.2 | 100.0 |
| Organic additives: | | |
| methyl cellulose binder | 21.03 | 0.272 |
| Additive A | .1.04 | 0.014 |
| Water | 300.6 | 3.89 |
| TOTALS | 8042.87 | 104.27 |

The use of fugitive organic additives which burn out during firing is conventional in the ceramics industry. The methyl cellulose serves to increase viscosity in the fluid stage and to provide some binding in the green and dried stage. The second additive is a lignosulfonate derivative, known in the ceramics industry by the term "Additive A", and serves to enhance deflocculation of the kaolin-water system and provide some buffering and surfactant activity.

Physical properties of the full sized bricks are shown in Table III below. For purposes of comparison, corresponding properties are also given for an English olivine brick and a developmental shale-bonded brick using domestic olivine.

TABLE III

| Dimensions, weights, densities and properties of full sized English made and North Carolina olivine bricks | | | |
|---|---|---|---|
| | olivine brick, kaolin-bonded* | Reference olivine brick, shale-bonded | Reference olivine English olivine brick |
| Dimensions, mm | | | |
| length | 247.1 | 247.6 | 247.0 |
| width | 164.5 | 165.1 | 166.6 |

TABLE III-continued

Dimensions, weights, densities and properties of full sized English made and North Carolina olivine bricks

|  |  | olivine brick, kaolin-bonded* |  | Reference olivine brick, shale-bonded | Reference English olivine brick |
|---|---|---|---|---|---|
| height |  | 86.3 |  | 90.03 | 86.3 |
| Weights, kg |  |  |  |  |  |
| green |  | 7.81 |  | 7.82 | — |
| dried |  | 7.73 |  | 7.69 | — |
| fired |  | 7.57 |  | 7.58 | 7.51 |
| Compressive Strength, |  |  |  |  |  |
| 25° C., MPa |  | 13.16 |  | 7.38 | 10.75 |
| Densities |  |  |  |  |  |
| bulk, g/cm³ |  | 2.58 |  | 2.41 | 2.57 |
| fractional |  | 0.783 |  | 0.742 | 0.802 |
| Volumetric | 100° C. | 0.571 |  | 0.524 | 0.568 |
| Heat Capacity | 250° C. | 0.632 |  | 0.576 | 0.626 |
|  | 400° C. | 0.645 |  | 0.572 | 0.651 |
| cal/cm³° K. | 550° C. | 0.639 |  | 0.570 | 0.660 |
| Thermal | 100° C. | 6.16 | (6.96)+ | 5.45 | 4.31 |
| Conductivity | 250° C. | 4.55 | (5.94) | 5.18 | 4.30 |
| $\frac{cal\ cm}{sec\ cm^{2\circ}\ K.} \times 10^3$ | 400° C. | 3.09 | (4.77) | 4.35 | 4.15 |
|  | 550° C. | 2.56 | (4.16) | 3.65 |  |

*Dimensions and weights are given as means
+Values shown are for heat-up, those in parentheses are for cooldown; the hysteresis in thermal conductivity is attributed to effects of microcracks on thermal diffusivity.

In order to demonstrate and evaluate the performance of the kaolin-bonded domestic olivine bricks under conditions of actual use, a 30 kw industrial heat storage furnace manufactured by TPI, Inc. was utilized. The core area of the furnace was divided into four separate vertical quadrants. Commercially available English olivine bricks were used to fill two diagonally opposite quadrants. The kaolin bonded domestic olivine brick of the present invention was loaded in one of the remaining quadrants, and the developmental shale-bonded domestic olivine brick in the other of the two remaining quadrants. The bricks were subjected to repeated diurnal heating/cooling cycles.

After approximately 30 charge-discharge cycles, the furnace was disassembled to permit examinatins of the cycled brick. Visual observations showed that the English and shale-bonded bricks have been subject to surface spalling ("dusting"), as evidenced by small accumulations of brick material at the lower air plenum sections. The kaolin-bonded brick did not display any evidence of dusting or other forms of spalling.

Sections cut from cycled brick of each of the three types were re-examined to determine changes, if any, in the thermal diffusivity versus temperature curves. The kaolin-bonded material displayed a hysteresis effect very much like that shown after its initial firing; the heating path was somewhat lower than the cooling path, a condition attributable to the stable system of controlled microcracks formed in this body. Though neither the shale-bonded nor the English olivine bricks had displayed hysteresis effects of this sort during initial studies prior to cycling in the furnace, after 30 cycles they both displayed fairly pronounced hysteresis effects indicative of cracking, or in this case, disbonding. Hysteresis induced by repeated cycling was particularly evident in the case of the English brick.

Scanning electron microscopic examinations of the surfaces and near surface regions (one-quarter to one-half inch behind the free surface) were carried out on sections of the cycled bricks. Markedly different bond characteristics (between the English and shale-bonded olivine bricks on the one hand, and the well sintered kaolin-bonded brick of the invention on the other) were very apparent at the surfaces. In the case of the English and shale-bonded bricks, thermal stresses which accompany cycling had been effective in breaking down the bonds between grains, giving rise to the observed "dusting." For the stronger, well sintered kaolin-bonded body, the same thermal stresses resulted only in microcracks, which traversed through grains as well as through grain boundaries. This spreading system of microcracks is evident even at low magnification, and can be seen to be quite intricate in its texture at higher magnifications. The presence of microcracks in the kaolin-bonded body had been inferred earlier from the very evident hysteresis behavior observed in the thermal diffusivity plots. The presence of these microcracks is clearly confirmed in the microstructure studies. That they are stable seems well confirmed by the fact that the hysteresis pattern observed in the thermal diffusivity plots after repeated cycling remains essentially the same as that observed after the initial firing of the body.

These same trends become even more evident when the structure of the material within the brick (near surface locations, approximately one-half inch back from the free surface) is examined by scanning electron microscopy. The English and shale-bonded products tend to come apart (rather much like gravel within a poorly bonded cementitious mass), failing by disruption of the rather tenuous clay-based bond at the grain interstices. In the case of the kaolin-bonded brick, the well developed sintered necks developed between the olivine grains are sufficiently strong to transmit stresses capable of fracturing directly across grains, so that substantial amounts of transgranular fracture are characteristic of this kaolin-bonded product, and of this product only.

EXAMPLE 2

A batch composition similar to that set forth in Table II above was prepared and used in producing smaller size test specimens using procedures similar to that in Example 1. The test specimens were pressed over a range of forming pressures from 4,000 to 15,000 psi. In this study, three different bond types were included, one being a self-bonded olivine, substituting −325 mesh olivine fines for the clay fraction normally added. The intermediate composition contained 1.25% kaolin as a bond phase. The third composition included the 2.5% kaolin bond phase which had been employed in the full-size brick study of Example 1. The results obtained are summarized in Table IV. The range of densities obtained over the range of forming pressures 4,000–15,000 psi was from 2.357–2.583 grams/cm.³, or a range of fractional densities from 0.710–0.804. Computer based reductions of these data indicated that the fractional density attained in both the green and fired states was approximately proportional to the logarithm of the forming pressure. Measurements were made of the thermal diffusivity of the test specimens which indicate that the hysteresis of thermal diffusivity with temperature (which is associated with good thermal shock resistance in the kaolin-bonded olivine) is clearly dependent not only on the presence of the kaolin, but also on a sufficient concentration, namely the 2.5% level. The diffusivity data obtained at a fractional density of greater than 0.8 are very similar to those obtained for full-size bricks fabricated at a somewhat lower fractional density.

TABLE IV

EFFECT OF BOND PHASE AND FORMING PRESSURE ON GREEN AND FIRED DENSITIES FOR UNBENEFICIATED ELLIJAY #9 (STEWART) OLIVINE SINTERED AT 1371° C. (2500° F.)

| FORMING PRESSURE Kpsi | GREEN DENSITY g/cm³ ($D_o$) | FIRED DENSITY g/cm³ ($D_f$) |
|---|---|---|
| | 2.5% OLIVINE FINES 325 MESH* | |
| 4 | 2.397 (0.722) | 2.357 (0.710) |
| 6 | 2.483 (0.748) | 2.404 (0.724) |
| 8 | 2.510 (0.756) | 2.453 (0.739) |
| 10 | 2.554 (0.769) | 2.494 (0.751) |
| 12 | 2.585 (0.779) | 2.526 (0.761) |
| 15 | 2.605 (0.785) | 2.564 (0.772)** |
| | 1-¼% KAOLIN# | |
| 4 | 2.404 (0.747) | 2.353 (0.731) |
| 6 | 2.457 (0.763) | 2.413 (0.749) |
| 8 | 2.492 (0.774) | 2.487 (0.772) |
| 10 | 2.532 (0.786) | 2.501 (0.777) |
| 12 | 2.573 (0.799) | 2.544 (0.790) |
| 15 | 2.602 (0.808) | 2.572 (0.799)## |
| | 2.5% KAOLIN+ | |
| 4 | 2.373 (0.739) | 2.352 (0.733) |
| 6 | 2.436 (0.758) | 2.422 (0.754) |
| 8 | 2.473 (0.770) | 2.476 (0.770) |
| 10 | 2.543 (0.791) | 2.503 (0.779) |
| 12 | 2.569 (0.799) | 2.564 (0.799) |
| 15 | 2.588 (0.805) | 2.583 (0.804)++ |

"Theoretical" densities were based upon measured pycnometric densities of fired, crushed material:
*, **3.227 g/cm³;
, ## 3.220 g/cm³;
+, ++3.213 g/cm³.

EXAMPLE 3

In this study, a commercial prototype beneficiated olivine from the Field deposit was obtained for evaluation rather than the Ellijay #9 material used in Examples 1 and 2. In its unbeneficiated state, the Field olivine is high in serpentine and other accessory minerals; it runs about 1% combined alkalis and alkaline earths ($K_2O$, $Na_2O$ and $CaO$) but after beneficiation those concentrations have been reduced to approximately 0.15%. Similarly, the MgO content had increased from about 45.3% to 47.5%. The loss on ignition (LOI) had been reduced from more than 1% to only ½%.

Preliminary screening studies had shown that Field olivine in its unbeneficiated state was not a very desirable candidate for ceramic processing. However, after beneficiation, the Field olivine was found to be very well behaved in the ceramic operations required for fabrication of heat storage refractories. Using procedures and bond compositions very much like those employed in Examples 1 and 2, test specimens of the beneficiated Field olivine were prepared. Two different bond types were investigated: (1) self-bonded containing 2.5% olivine fines instead of kaolin and (2) kaolin-bonded, containing 2.5% refractory plastic kaolin. Specimens were formed over a range of pressures, in this instance ranging from 8,000 to 30,000 psi. Because of the greater refractoriness of the beneficiated material (containing few of the lower density, lower melting accessory minerals) it was necessary to increase the firing temperatures somewhat. The self-bonded material was fired at approximately 1454° C. (2650° F.), the kaolin-bonded material was sintered at approximately 1427° C. (2600° F.).

The results obtained in this phase of the study are summarized in Table V, which shows a range of fired densities of 2.563–2.805 g/cm³. The green and fired densities were found to depend essentially linearly upon the logarithm of the forming pressure. Because of the reduced content of accessory minerals and higher sintering temperatures, these bodies also showed a distinct densification effect, with fired densities being higher than green densities, a condition not previously experienced with the unbeneficiated Ellijay #9 olivine. In this case, too, the advantages conferred during processing by the use of kaolin-bonding are clearly evident, i.e. at 30,000 psi both the self-bonded and the kaolin-bonded bodies had essentially similar green densities (2.7 g/cm³; 0.083 fractional density). However, after sintering, the self-bonded material had increased to 2.788 g/cm³ (0.855), whereas the lower fired but, kaolin-bonded material had a substantially higher increase, to 2.805 g/cm³ (0.866).

Examples 2 and 3 clearly point to the improved densities and thermal properties of olivine based refractories which can be obtained under proper ceramic process conditions. Those conditions include (a) beneficiation of the olivine ores, (b) use of high forming pressures, (c) use of well engineered production quality forming equipment and (d) careful control of particle sizing and size blending to achieve optimum particle packing. Under full scale pilot plant or production conditions which would meet these criteria, one would expect to obtain densities even higher than those shown in Tables IV and V. Under such circumstances, it seems reasonable to predict that fractional densities as high as 0.90% could be realistically attained. Such dense bodies would yield substantial benefits in terms of high volumetric heat capacity and high thermal conductivity, without incurring excessive risk of thermal shock failures in well insulated heat storage furnace applications.

In the specification there have been set forth preferred embodiments of the invention, and although specific terms are employed, they are used in a generic and descriptive sense only and not for purposes of limitation.

TABLE V

EFFECT OF BOND PHASE AND FORMING PRESSURE ON GREEN AND FIRED DENSITIES OF SINTERED BENEFICIATED FIELD OLIVINE

| FORMING PRESSURE Kpsi | GREEN DENSITY g/cm³ ($D_o$) | FIRED DENSITY g/cm³ ($D_f$) |
|---|---|---|
| | 2.5% Olivine Fines (−325 mesh)* 1454° C. (2650° F.) | |
| 8 | 2.504 (0.768) | 2.563 (0.786) |
| 10 | 2.537 (0.778) | 2.571 (0.778) |
| 12 | 2.528 (0.775) | 2.601 (0.798) |
| 15 | 2.596 (0.796) | 2.632 (0.807) |
| 20 | 2.653 (0.814) | 2.717 (0.833) |
| 25 | 2.658 (0.815) | 2.739 (0.840) |
| 30 | 2.700 (0.828) | 2.788 (0.855)** |
| | 2.5% KAOLIN,+ 1427° C. (2600° F.) | |
| 10 | 2.510 (0.775) | 2.619 (0.808) |
| 13.5 | 2.580 (0.796) | 2.686 (0.829) |
| 15 | 2.581 (0.796) | 2.680 (0.827) |
| 20 | 2.627 (0.811) | 2.737 (0.845) |
| 25 | 2.664 (0.822) | 2.760 (0.851) |
| 30 | 2.691 (0.831) | 2.805 (0.866)++ |

"Theoretical" densities were based upon measured pycnometric densities of fired, crushed material:
*, **3.260 g/cm³;
+, ++3.241 g/cm³.

That what is claimed is:

1. An olivine refractory brick having thermal and physical properties suitable for use as a thermal energy storage unit in an electric thermal storage furnace and having excellent thermal shock properties and resistance to spalling, said brick consisting essentially of densely compacted grains of olivine and a plastic refractory kaoline binder effecting a sintered, liquid assisted but substantially solid state grain-to-grain bonding of the olivine, and said refractory brick exhibiting microcracking extending through the olivine grains.

2. An olivine brick as set forth in claim 1 further characterized by having a temperature dependent thermal conductivity hysteresis in the initially fired state.

3. An olivine brick as set forth in claim 1 having, in the initially fired state, a thermal conductivity at 100° C. greater than 0.005 cal./cm. sec. °C.

4. An olivine brick as set forth in claim 1 wherein said olivine grains are of a particle size less than 4 mesh, with a significant fraction finer than 65 mesh.

5. An olivine brick as set forth in claim 4 wherein said olivine grains are of a particle size distribution, accomplished by deliberate gap grading, such that more than 40% by weight is between 4 and 20 mesh, less than 30% by weight is between 20 and 65 mesh, and about 30% by weight is finer than 65 mesh.

6. An olivine brick as set forth in claim 4 wherein said olivine grains are of a particle size distribution such that about 40% by weight is between 8 and 20 mesh, about 30% by weight is between 20 and 65 mesh, and about 30% by weight is finer than 65 mesh.

7. An olivine brick as set forth in claim 1 having a fired bulk density of at least about 2.50 grams per cubic centimeter.

8. An olivine brick as set forth in claim 1 having a fired bulk density within the range of 2.58 to 2.93 grams per cubic centimeter.

9. An olivine brick as set forth in claim 1 wherein said olivine comprises beneficiated olivine having a pycnometric density, measured in water, of at least 3.19 grams per cubic centimeter.

10. An olivine brick as set forth in claim 8 having a fired bulk density of at least about 2.62 grams per cubic centimeter.

11. An olivine refractory brick having thermal and physical properties suitable for use as a thermal energy storage unit in an electric thermal storage furnace and having excellent thermal shock properties and resistance to spalling, said brick consisting essentially of grains of olivine densely compacted and sintered to provide a fired bulk density within the range of 2.58 to 2.93 grams per cubic centimeter and having a volumetric heat capacity at 100° C. of at least 0.525 cal./cc. °C. and a thermal conductivity at 100° C. greater than 0.005 cal./cm. sec. °C. and a plastic refractory kaolin binder effecting a sintered, liquid assisted but substantially solid state grain-to-grain bonding of the olivine.

12. An olivine refractory brick having thermal and physical properties suitable for use as a thermal energy storage unit in an electric thermal storage furnace and having excellent thermal shock properties and resistance to spalling, said brick consisting essentially of crushed and sized grains of olivine having a particle size of less than 4 mesh, and being densely compacted and sintered to provide a fired bulk density within the range of 2.58 to 2.93 grams per cubic centimeter and having, in the initially fired state, a thermal conductivity at 100° C. greater than 0.005 cal./cm. sec. °C. and a plastic refractory kaolin binder effecting a sintered, liquid assisted but substantially solid state grain-to-grain bonding of the olivine, and said refractory brick exhibiting microcracking extending through the olivine grains.

13. An unfired, green olivine brick characterized by providing thermal and physical properties in the fired state suitable for use as a thermal energy storage unit in an electric thermal storage furnace and having excellent thermal shock properties and resistance to spalling, said brick, exclusive of water and conventional processing additives, consisting essentially of densely compacted grains of olivine and from about 1.25% to about 5% by weight of a plastic refractory kaolin binder.

14. An unfired olivine brick as set forth in claim 13 wherein said kaolin binder comprises about 2.5 percent of the brick by weight.

15. An unfired olivine brick as set forth in claim 13 having a green bulk density of at least about 2.3 grams per cubic centimeter.

16. An unfired olivine brick as set forth in claim 15 having a green bulk density within the range of 2.37 to 2.75 grams per cubic centimeter.

17. An unfired olivine brick as set forth in claim 13 wherein said olivine comprises beneficiated olivine having a pycnometric density, measured in water, of at least 3.19 grams per cubic centimeter.

18. An unfired olivine brick as set forth in claim 17 having a green bulk density of at least about 2.51 grams per cubic centimeter.

19. An unfired olivine brick as set forth in claim 18 wherein said olivine grains are of a particle size distribution, accomplished by deliberate gap grading, such that more than 40% by weight is between 4 and 20 mesh, less than 30% by weight is between 20 and 65 mesh, and about 30% by weight is finer than 65 mesh.

20. An unfired, green olivine brick characterized by providing thermal and physical properties in the fired state suitable for use as a thermal energy storage unit in an electric thermal storage furnace and having excellent thermal shock properties and resistance to spalling, said brick, exclusive of water and conventional processing additives, consisting essentially of crushed and sized grains of olivine having a particle size of less than 4 mesh, and being densely compacted to provide a green bulk density of at least about 2.38 grams per cubic centimeter, and from about 1.25% to about 5% by weight of a plastic refractory kaolin binder.

21. A thermal energy storage reservoir comprising a plurality of the olivine refractory bricks of claim 1 assembled in stacked relationship.

22. A thermal storage furnace containing a plurality of the olivine refractory bricks of claim 1.

* * * * *

UNITED STATES PATENT AND TRADEMARK OFFICE
CERTIFICATE OF CORRECTION

PATENT NO. : 4,303,448
DATED : December 1, 1981
INVENTOR(S) : Hayne Palmour, III; Billy M. Gay; Ronald L. Cochrane It is certified that error appears in the above-identified patent and that said Letters Patent are hereby corrected as shown below:

Column 4, line 5: "at" should be --to--

Column 9, line 43: "examinatins" should be --examinations--

Column 11, Table IV: "30" should be --+--

Column 14, line 37, Claim 19: "18" should be --13--

Signed and Sealed this

Eighteenth Day of May 1982

[SEAL]

Attest:

Attesting Officer

GERALD J. MOSSINGHOFF

Commissioner of Patents and Trademarks